US009950485B2

(12) United States Patent
Slot et al.

(10) Patent No.: US 9,950,485 B2
(45) Date of Patent: Apr. 24, 2018

(54) APPARATUS AND METHOD FOR FORMING AN ANNULAR APEX FILLER FOR TIRE BEADS

(71) Applicant: VMI Holland B.V., RK EPE (NL)

(72) Inventors: Marco Slot, HT Westerbork (NL); Gerard Johannes Van Laar, AB Vaassen (NL)

(73) Assignee: VMI HOLLAND B.V. (NL)

( * ) Notice: Subject to any disclaimer, the term of this patent is extended or adjusted under 35 U.S.C. 154(b) by 282 days.

(21) Appl. No.: 14/764,915

(22) PCT Filed: Jan. 7, 2014

(86) PCT No.: PCT/NL2014/050003
§ 371 (c)(1),
(2) Date: Jul. 30, 2015

(87) PCT Pub. No.: WO2014/119996
PCT Pub. Date: Aug. 7, 2014

(65) Prior Publication Data
US 2015/0352798 A1 Dec. 10, 2015

(30) Foreign Application Priority Data
Jan. 30, 2013 (NL) ..................... 2010201

(51) Int. Cl.
*B29D 30/48* (2006.01)
(52) U.S. Cl.
CPC ........ *B29D 30/48* (2013.01); *B29D 2030/482* (2013.01)
(58) Field of Classification Search
CPC ............................. B29D 2030/482; B29D 30/48
(Continued)

(56) References Cited

U.S. PATENT DOCUMENTS 3,895,986 A * 7/1975 Komatsu ................ B29D 30/48
156/126
3,909,338 A * 9/1975 Leblond ................. B29D 30/48
156/123
(Continued)

FOREIGN PATENT DOCUMENTS

JP 06106654 A 4/1994
JP 07214694 A 8/1995
(Continued)

OTHER PUBLICATIONS

International Preliminary Report on Patentability issued in PCT/NL2014/050003, dated Aug. 4, 2015, 11 pages.
(Continued)

*Primary Examiner* — Joseph S Del Sole
*Assistant Examiner* — Cedrick S Williams
(74) *Attorney, Agent, or Firm* — Faegre Baker Daniels LLP (57) ABSTRACT

The invention relates to an apparatus and a method of forming an annular apex filler for tire beads. Said apparatus comprises a cylindrical former (2) for supporting a cut length of an apex filler strip (91) of elastomeric material, wherein said cylindrical former (2) comprises a hollow rotary shaft (21) and a plurality of rigid, circumferentially spaced apart fingers (22). The fingers (22) are movably connected to support members (24) for flipping the apex filler when wound on the cylindrical former. The support members (24) are movable connected to substantially radially extending guiding members (25). The guiding members (25) are connected to a hollow rotary shaft (21). The fingers (22) are connected via linkages (27) to a driving member (281) which is connected to a push/pull shaft (28) which extends at least partially through the hollow rotary shaft (21). Said apparatus further comprises a setting unit comprising a setting plate (26), said unit being arranged for
(Continued)

moving the support members (24) radially inwardly or outwardly, and a feed assembly for feeding said apex filler (91) to said cylindrical former (2).

28 Claims, 6 Drawing Sheets

(58) Field of Classification Search
USPC .................................................. 156/136, 420
See application file for complete search history.

(56) References Cited

U.S. PATENT DOCUMENTS

| | | | |
|---|---|---|---|
| 5,350,470 A | | 9/1994 | Mochel et al. |
| 5,486,261 A | * | 1/1996 | Kikuchi ................. B29D 30/48 156/422 |
| 2007/0256790 A1 | * | 11/2007 | Nijhuis ................. B29D 30/48 156/422 |
| 2009/0266474 A1 | * | 10/2009 | Matsuyama ........... B29D 30/48 156/136 |
| 2014/0161584 A1 | * | 6/2014 | Kohnen ............. B29D 30/2607 414/806 |

FOREIGN PATENT DOCUMENTS

| | | |
|---|---|---|
| KR | 20070022102 A | 2/2007 |
| KR | 20070095898 A | 10/2007 |
| SU | 1382662 A1 | 3/1988 |
| SU | 1593972 A1 * | 9/1990 |
| WO | 2005/118271 A1 | 12/2005 |
| WO | 2005118271 A1 | 12/2005 |
| WO | 2014119996 A1 | 8/2014 |

OTHER PUBLICATIONS

International Search Report and Written Opinion issued in PCT/NL2014/05003, dated Mar. 20, 2014, 16 pages.

* cited by examiner

APPARATUS AND METHOD FOR FORMING AN ANNULAR APEX FILLER FOR TIRE BEADS

CROSS REFERENCE TO RELATED APPLICATIONS

This is a § 371 application of International Application No. PCT/NL2014/050003, entitled "Apparatus for forming an annular apex filler," filed on Jan. 7, 2014, which claims the benefit of Netherlands Application No. 2010201, filed on Jan. 30, 2013, the full disclosures of each of which are expressly incorporated herein by reference in their entireties.

BACKGROUND

The invention relates to an apparatus for forming an annular apex filler, which subsequently can be applied to a bead ring to form a tire bead assembly for use in the manufacturing of vehicle tires.

Such an apparatus is for example known from International Patent application WO 2005/118271. The known apparatus comprises a cylindrical former for supporting a cut length of an apex filler of elastomeric material, a feed assembly for feeding said apex filler to said cylindrical former, and a drum positionable adjacent said former for supporting a bead core ring. The cylindrical former comprises a first gripper for gripping a leading end of said length of apex filler so as to retain said end on said cylindrical former whilst said length of apex filler is wound in a single turn thereon. The feed assembly comprises a second gripper for gripping a trailing end of said length of apex filler, wherein said second gripper is movable towards and away from said cylindrical former. Said apparatus is further provided with a splicing unit for joining aligned cut ends of the length of apex filler when the latter is wound in a single turn on the cylindrical former. Said cylindrical former is defined by a plurality of rigid, circumferentially spaced apart fingers which are hingedly connected to support members which are mounted for radial movement. The support members are provided with cam follower projections which are received in a cam slot, in particular a spiral slot in a plate behind the support members. The radial positions of the support members is adjusted by rotating the plate with the spiral slot with respect to the support members. In addition, each support members is provided with one finger which is connected via a linkage to an actuator having projections extending through the spiral slot. When the plate with the spiral slot is moved towards the support members, the actuator pushes the linkage which operates the fingers to hinge for flipping the apex filler when wound on the cylindrical former so that a base portion thereof surrounds the bead core ring and adheres to the latter, wherein a tapering portion of the apex filler extends generally radially outward.

The aforementioned apparatus is complex due to the couplings to be made to the drives of the plate with the spiral slot and the construction of the support members with the actuator and linkage for operating the fingers itself.

It is an object of the present invention to provide an improved apparatus for handling apex filler strips to form an annular apex filler.

SUMMARY OF THE INVENTION

According to a first aspect, the invention provides an apparatus for forming an annular apex filler, comprising:

a cylindrical former for supporting a cut length of an apex filler of elastomeric material, wherein said cylindrical former comprises a rotary shaft and a plurality of rigid, circumferentially spaced apart fingers, said fingers are movably connected to support members for flipping the apex filler when wound on the cylindrical former, wherein said support members are movable connected to substantially radially extending guiding members, wherein the guiding members are connected to the rotary shaft, a setting unit which is arranged for moving the support members radially inwardly or outwardly, and a feed assembly for feeding said apex filler to said cylindrical former, wherein the rotary shaft is a hollow rotary shaft, and wherein the fingers are connected via linkages to a driving member which is connected to a push/pull shaft which extends at least partially through the hollow rotary shaft. The push/pull shaft which extend through the hollow rotary shaft provides a more robust drive for moving the fingers for flipping the apex filler when wound on the cylindrical former, at least when compared with an actuator for each support member using relatively thin projections which extend through a spiral slot as disclosed in WO 2005/118271.

In an embodiment, at least one of said linkages comprises a gear wheel which is connected to at least one of said fingers, and a gear rack which is actively connected to said gear wheel. The gear rack is connected to said driving member, wherein the driving member is back and forth movable by said push/pull shaft. The gear wheel and the gear rack together form a compact transmission, at least when compared with the multiple lever transmission as disclosed in WO 2005/118271. In addition gear wheel and gear rack transmission of the invention can easily be designed to obtain the desired transmission ratio for obtaining the desired flipping motion of the fingers in combination with a specific range of back and forth movement of said push/pull shaft.

In an advantageous embodiment, the gear rack is slidably supported on one of said support members.

In an embodiment, substantially each support member comprises at least one of said fingers and at least one of said linkages.

In an embodiment, the driving member comprises a substantial radially extending guiding elements which are connected to the push/pull shaft, and wherein the linkages are connected to and movable along the guiding elements. In particular since the support members are arranged for moving radially inwardly or outwardly, the linkages can move along the guiding elements together with a radial movement of the support members.

In an embodiment, the cylindrical former comprises a first gripping device comprising a first gripper for gripping the apex filler, wherein the first gripping device comprises an actuator for moving the first gripper between a gripping and a non-gripping position. Said first gripper is arranged for gripping a leading end of said length of apex filler so as to retain said end on said cylindrical former whilst said length of apex filler is wound in a single turn thereon. Thus the first gripper and the actuator are arranged to rotate together with the cylindrical former. In an embodiment said actuator comprises an electric motor, a pneumatic cylinder or a hydraulic cylinder.

In an embodiment, the push/pull shaft is a hollow push/pull shaft, and wherein the actuator is connected to a supply cable or supply hose, which supply cable or supply hose extends at least partially through the hollow push/pull shaft.

The use of a hollow push/pull shaft allows the lead through of a supply cable, in the case of an electric motor, or a supply hose, in the case of an pneumatic or hydraulic cylinder, to operate said actuator.

Alternatively or in addition, the supply cable or supply hose is in an embodiment at least partially integrated with the push/pull shaft or with the rotary shaft.

In an embodiment, the push/pull shaft is rotation fixedly arranged in the hollow rotary shaft, and wherein the push/pull shaft is provided with a rotatable electrical coupling or a rotatable fluid- and/or vacuum coupling. The rotatable coupling provides a first input/output which is able to rotate together with the cylindrical former and a second input/output which is substantially stationary arranged on the apparatus. The second input/output provides a easy way for connecting an external supply for operating the actuator. In the context of this patent application a fluid coupling may comprise one of a pneumatic (gas) coupling and a hydraulic (liquid) coupling.

In an advantageous embodiment, the first gripping device is arranged on one of said support members.

In case the first gripping device is arranged on one of said support members, the presence of the first gripper should not interfere with the movement of the fingers for flipping the apex filler. Therefore, in an embodiment, the first gripper is hingedly connected to said one of said support members. In this case the first gripper can swing away out of the path of the movable fingers before said fingers are actuated for flipping the apex filler.

In an embodiment, the first gripping device is connected to said one of said support members, wherein the connection is arranged for approaching the apex filler in a substantially radial oriented movement with respect a centre axis of the cylindrical former. Such a substantially radial oriented movement of the first gripping device for approaching and for gripping the apex filler at least substantially prevents damaging the apex filler by the gripping device and/or at least substantially prevents that the gripping device exerts an axial oriented force on the apex filler, which axial oriented force may deform the apex filler and/or may push the apex filler out of alignment.

In an embodiment, the actuator is a substantially linear actuator which is hingedly connected to said first gripper, wherein said first gripper is hingedly connected to a first end of a shank, and wherein an opposite second end of the shank is hingedly connected to said support member. Preferably, at the first gripper, the connection of the first end of the shank is at a distance to the connection of the linear actuator. This three-hinge connection is arranged so that the first gripper approaches the apex filler, when arranged on said cylindrical former, in a substantially radial oriented movement with respect to the cylindrical former. When opening the first gripper, said first gripper will at first move in a substantially radial direction and will subsequently swing away out of the path of the movable fingers.

In an embodiment, at least one finger of said one of said support members provides a platform for supporting the apex filler, and the first gripper comprises a pressing element, wherein the pressing element comprises an array of pressure pins which face towards the platform, wherein the pressure pins are arranged for contacting the platform and the apex filler supported thereon. The pressure pins can ensure that pressure is applied evenly across the apex filler, regardless of the cross sectional shape of said apex filler. The evenly applied pressure prevents the apex filler from being squeezed sideways.

In an embodiment, the pressure pins are biased to move towards the platform, wherein, when the first gripper is moved in the gripping position to engage the apex filler, at least some of the pressure pins are arranged for contacting the apex filler and are arranged to be pushed back against their bias as a result of said contact. As a result, the mutual positions of the pressure pins can be adapted to match the contour or profile of the apex filler, and as such, an even distribution of forces can be applied by the pressing element via the pressure pins onto the apex filler. In this manner, damage to the apex filler can be avoided.

In an embodiment of the invention, the support members are angularly distributed around the rotary shaft, in particular the rotation axis of said cylindrical former, wherein said support members are preferably spaced apart from each other. In an embodiment, the fingers are hingedly connected to said support members.

In an embodiment, the setting unit comprises a setting plate which is rotatably arranged on said rotary shaft. The setting plate may comprise camming means, and said support members may comprise cam followers. Turning of the setting plate relative to the support members causes the latter to move together radially inwardly or outwardly. Suitably the setting plate does not need to be movable axially as in WO 2005/118271 to actuate the flipping action of said fingers. In the apparatus of the present invention this flipping action of the fingers is actuated by of the driving member which is connected to the push/pull shaft.

In an embodiment, the setting plate comprises at least one spiral slot, and wherein each of the support members comprises at least one cam follower projection which are received in the at least one spiral slot. In an embodiment, the setting plate comprises one spiral slot for each one of said support members.

In an embodiment, the push/pull shaft extends from one side of the setting plate, through the hollow rotary shaft, to the opposite side of the setting plate.

In an embodiment, said apparatus further comprising a first drive for rotating the rotary shaft and a second drive for moving the push/pull shaft back and forth substantially along the centre axis of the rotary shaft.

In an embodiment, the push/pull shaft is coupled to the second drive on the one side of the setting plate and to the driving member on the opposite side of the setting plate.

In an embodiment, said apparatus further comprising a third drive for actuating the setting unit for moving the support members radially inwardly or outwardly. The use of three drives, one for rotating the cylindrical former, one for moving the push/pull shaft for flipping the fingers, and one for setting the radial position of the support members, allows for a simple and straight forward control for driving the apparatus of the invention. In an embodiment the third drive is driven synchronously with the first drive in order to rotate the cylindrical former without moving the support member in radial direction.

In an embodiment, the a feed assembly comprises a conveyor for supporting the apex filler along a substantially linear path towards said cylindrical former, wherein, preferably, the linear path is tangential to the circumference of the cylindrically arranged support members. The apex filler can be transported along the linear path towards the cylindrical former and can be fed towards and applied onto the cylindrical former in a tangential manner.

In an embodiment, the feed assembly and the cylindrical former are movable with respect to each other in order to position the linear path tangential with respect to the support members. Preferably the feed assembly is substantially vertical movable with respect to the cylindrical former.

According to a second aspect, the invention relates to a method of forming an annular apex filler using an apparatus as described above, said method comprising the steps of:

providing a length of an apex filler of elastomeric material, the apex filler having an annular base portion and an annular tapering portion for extending axially away from the base portion;

gripping a leading end of said length of apex filler so as to retain said end on the cylindrical former;

gripping a trailing end of said length of apex filler using gripping means;

rotating said cylindrical former so that said length of apex filler is wound thereon in a single turn and is supported by the fingers, whilst moving said gripping means and said gripped trailing end towards said cylindrical former;

joining said leading and trailing ends together; and flipping the apex filler so that the tapering portion radially surrounds the base portion and the tapering portion extends generally radially outwardly.

According to a further aspect, the invention relates to a method of forming an annular apex filler using an apparatus according to any one of the preceding claims, said method comprising the steps of:

providing a cut length of an apex filler of elastomeric material in an annular configuration on the cylindrical former, the apex filler having an annular base portion and an annular tapering portion for extending axially away from the base portion, so that the cut ends are aligned and abut one another, and flipping the apex filler using the plurality of circumferentially spaced apart fingers, so that the tapering portion radially surrounds the base portion and the tapering portion extends generally radially outwardly, wherein the fingers are being actuated to flip the apex filler by means of the driving member which is connected to the push/pull shaft which extends at least partially through the hollow rotary shaft, wherein the push/pull shaft is driven back and forth substantially along the centre axis of the rotary shaft, wherein the fingers are connected to the driving member via linkages.

U.S. Pat. No. 3,895,986 A discloses an apparatus for applying a strip of elastic material to a tire bead, the apparatus having a separate strip transfer means and bead holding means. The bead holding means is arranged on a stationary column and is provided with a disc member which supports a collapsible cage with a variable diameter for holding a bead. The strip transfer means is arranged on a mobile column that is arranged to approach the bead holding means from a side opposite to the driving means of the bead holding means. The strip transfer means is provided with a further disc member being axially moveable over a shaft. The further disc member is coupled via link arms to stiffener supporting members to support and rotate the elastic material towards the bead when the strip transfer means arrives at the bead holding means. One of the drawbacks of the strip transfer means is that it significantly blocks or limits access to the bead holding means. Also, tolerances may occur in the alignment of the strip transfer means with respect to the bead holding means. It is noted that the known apparatus does not disclose a push/pull shaft that extends at least partially through the hollow rotary shaft and that is driven back and forth to actuate fingers for flipping an apex filler. The push/pull shaft which extend through the hollow rotary shaft can provide a more robust drive for moving the fingers for flipping the apex filler when wound on the cylindrical former.

In an embodiment the push/pull shaft extends at least partially through the hollow rotary shaft from the side of the rotary shaft at the driving member, wherein, on the opposite side of the rotary shaft with respect to the driving member, the push/pull shaft is connected to a driving means that drives the push/pull shaft back and forth substantially along the centre axis of the rotary shaft.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which.

DETAILED DESCRIPTION OF THE INVENTION

Figure 1:
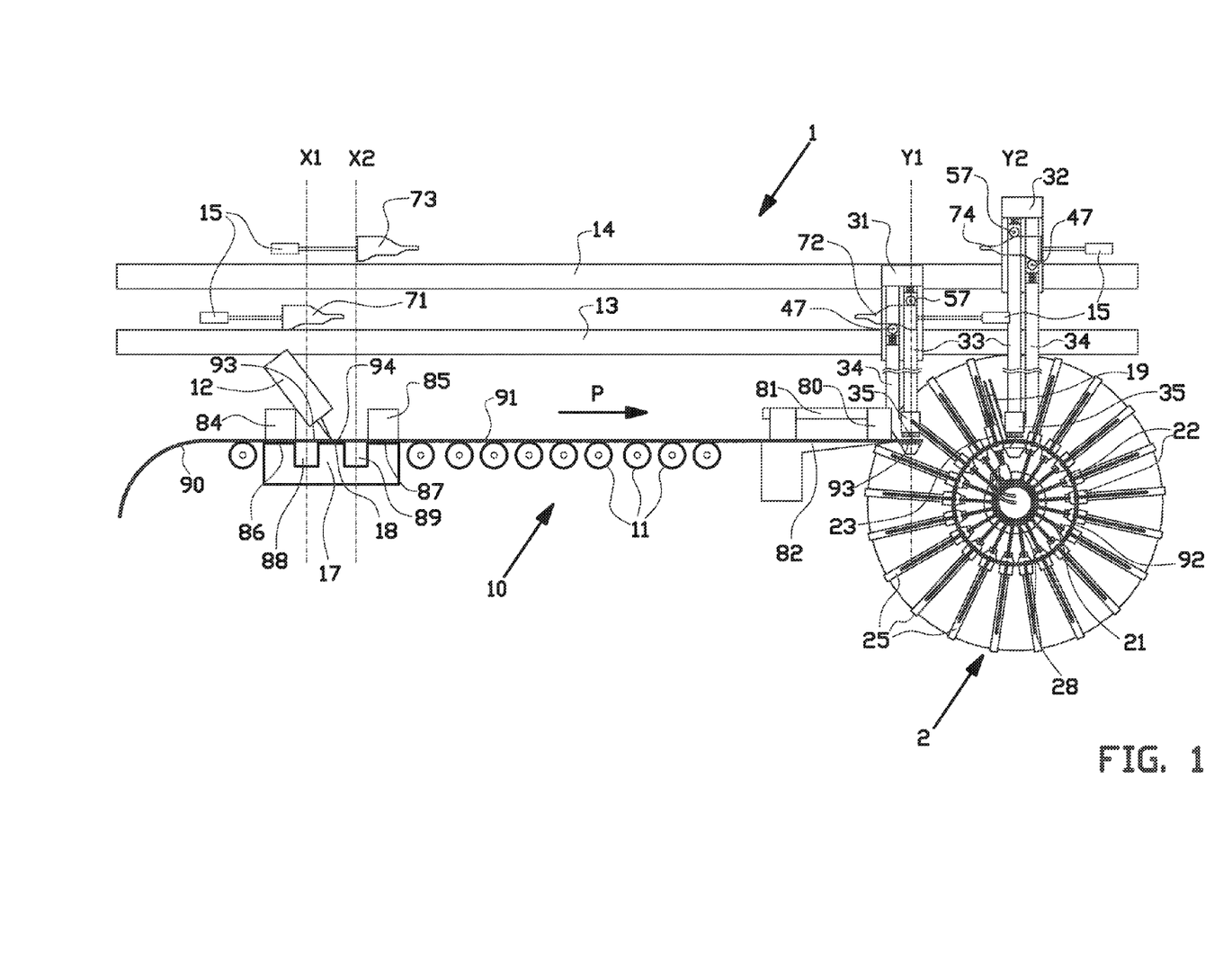
FIG. 1 shows a front view of an apparatus for forming an annular apex filler according to an exemplary embodiment of the invention.

FIG. 1 shows a schematic front view of an apparatus 1 for forming an annular apex filler. Said apparatus comprises a feed assembly which is arranged for providing a length of apex 90 of unvulcanized, elastomeric or rubber material, cutting said length of apex into apex strips 91, forming said strips into an annular apex filler 92, and for flipping said annular apex filler 92. As described in more detail in the prior art document WO 2005/118271 the flipping action can be used for positioning a base portion of the annular apex filler against and around a bead core ring, in order to adhere the annular apex filler to said bead core ring.

As shown in FIG. 1, the feed assembly comprises a roller conveyor 10 with a plurality of passive rollers 11. On the upper side or transport side of the roller conveyor 10, the rollers 11 define a plane of conveyance over which the apex filler 90 can be transported along a substantially linear path in the direction of conveyance P.

Above the plane of conveyance and parallel to the direction of conveyance P, the feed assembly is provided with a first guide rail 13 and a second guide rail 14. The feed assembly comprises a two grippers 31, 32 which are placed on the first guide rail 13 and the second guide rail 14 so as to be moveable in the longitudinal direction of the guide rails 13, 14. Two guide rails 13, 14 are preferred for good distribution of the forces of the grippers 31, 32 exerted on them and to reduce material costs. Alternatively, the feed assembly can be provided with a single, wide guide rail (not shown) onto which both grippers 31, 32 are placed. The feed assembly is provided with drives (not shown) which independently control the movement of one of the grippers 31 along the first guide rail 13 between a first start position X1 and a first end position Y1 and the movement of the other one of the grippers 32 along the second guide rail 14 between a second start position X2 and a second end position Y2. The drives can be linear motors arranged on the grippers 31, 32 or timing belts arranged along the guide rails 13, 14.

The feed assembly further comprises a cutting device 12 having a cutting knife which is placed above the plane of conveyance and an anvil 17 which is placed just underneath the plane of conveyance. The anvil 17 comprises a cutting surface 18 and two clamping surfaces 86, 87. The cutting knife of the cutting device 12 can moved onto the cutting surface 18 of the anvil 17 for cutting the length of apex 90 into an apex strip 91 having a leading end 93 and a trailing end 94. The feed assembly is provided with two clamping blocks 84, 85 which are arranged for moving towards the clamping surfaces 86, 87. The clamping blocks 84, 85 can be lifted upwards to move out of the way of the grippers 31, 32. In between the cutting surface 18 and the clamping surfaces 86, 87, the anvil 17 is provided with recesses 88, 89 for receiving the grippers 31, 32.

As shown in FIG. 1, the feed assembly is provided with wedges 71, 72, 73, 74 which are positioned at or near the start and end positions. In addition, the feed assembly is provided with drives 15, such as pistons or linear drives, which are arranged for actively controlling the positions of or moving the wedges 71-74 towards or away from their respective positions X1, X2, Y1, Y2, and thus for moving the wedges 71-74 towards and away from the grippers 31, 32 when they are in one of the positions X1, X2, Y1, Y2.

The grippers 31, 32 are provided with a clamp arm 33 for supporting a clamp 35, and a clamp surface arm 34. The clamp arm 33 and the clamp surface arm 34 are movable in a direction substantially perpendicular to the guide rails 13, 14, and are provided with wheels 47, 57 which are arranged to come in abutment with the wedges 71, 74 in order to control the position of the clamp 35 and the clamp surface with respect to each other and with respect to the apex filler 90, 91.

As shown in FIG. 1, the feed assembly further comprises an applicator clamp 80 for receiving the apex filler 90 from the one of the grippers 31. The applicator clamp 80 comprises a clamping arm 81 for clamping the apex filler 90 and a platform 82 for supporting the clamped apex filler 90 in the plane of conveyance.

As shown in FIG. 1, the apparatus 1 comprises an cylindrical former 2 for holding an apex filler strip 91 in an endless, substantially circular configuration. The cylindrical former 2 comprises a hollow rotary shaft 21 and a plurality of rigid, circumferentially spaced apart fingers 22, which define a virtual circumferential path around which, in use, the apex filler strip 91 is arranged.

The cylindrical former 2 comprises a first gripper 23 which is arranged to rotate together with the fingers 22 coaxially with respect to the bead holder 2 and to clamp the leading end of the apex filler strip 91. In this exemplary embodiment the first gripper 23 is an integral part of the cylindrical former 2, more in particular the first gripper 23 is connected to one of the fingers 22 as schematically shown in FIGS. 5 and 6.

Figure 2:
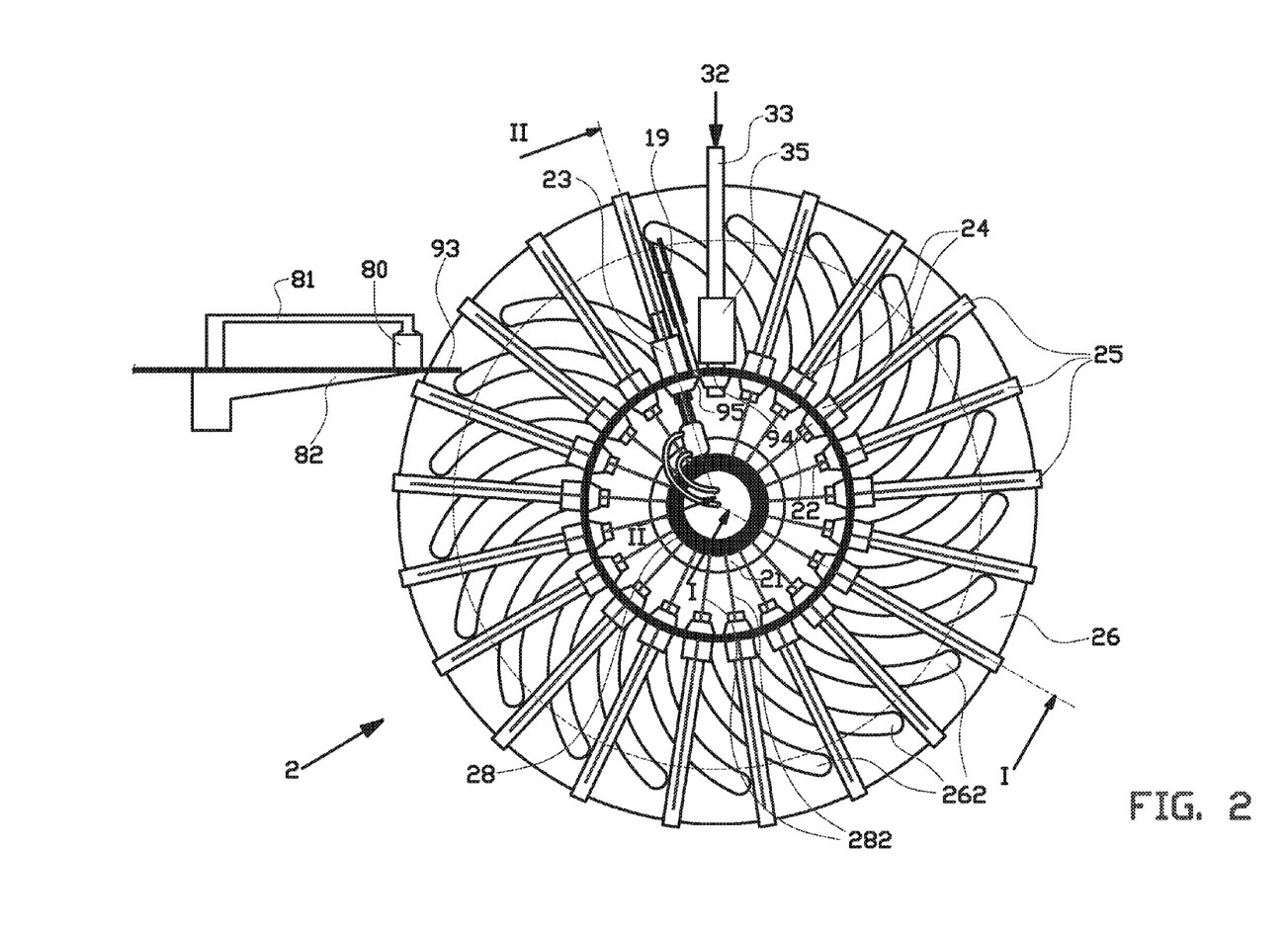
FIGS. 2 and 3 show a front view of the cylindrical former configured for forming tire bead assemblies for small and large tires respectively.
Figure 3:
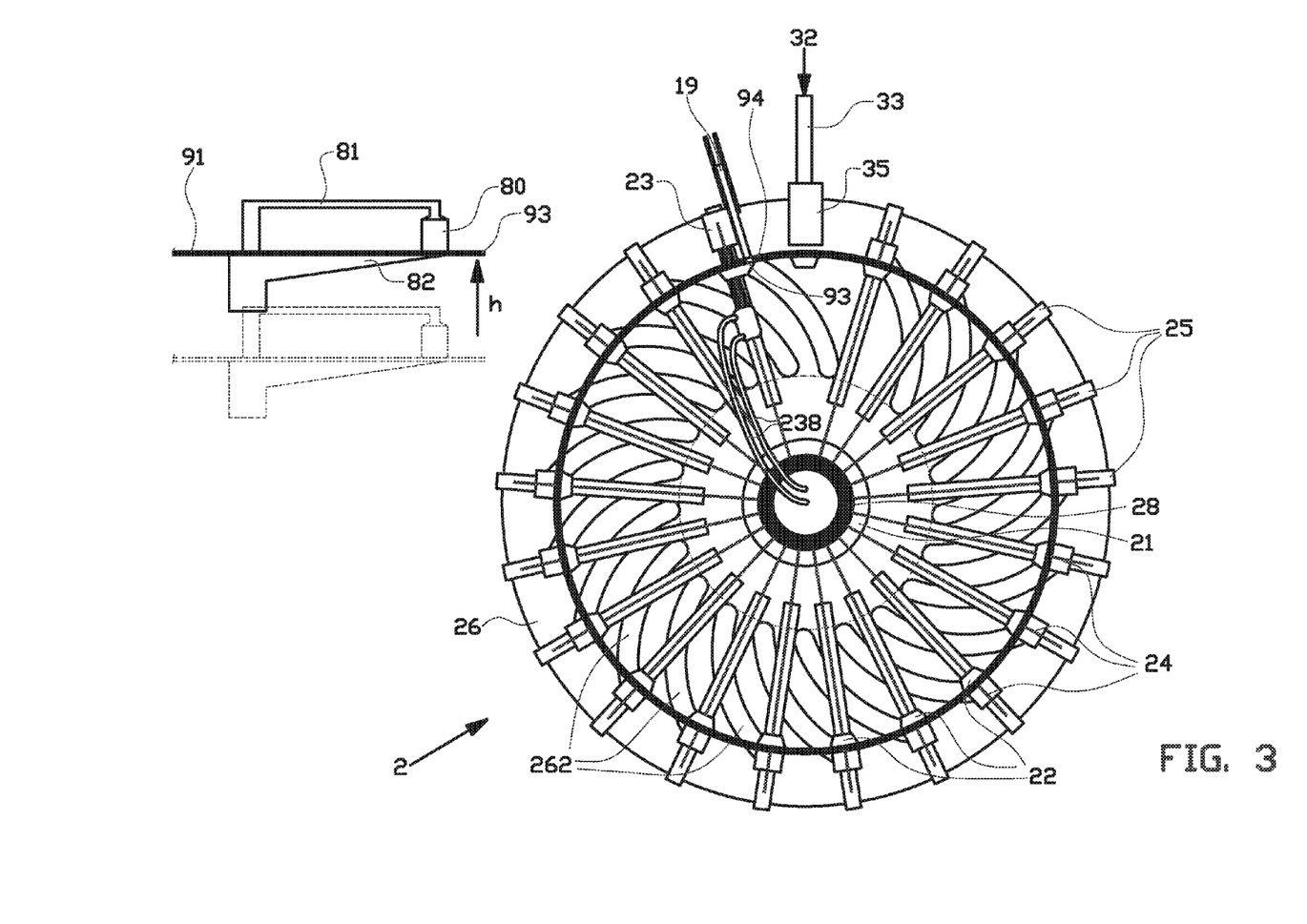
Figure 4:
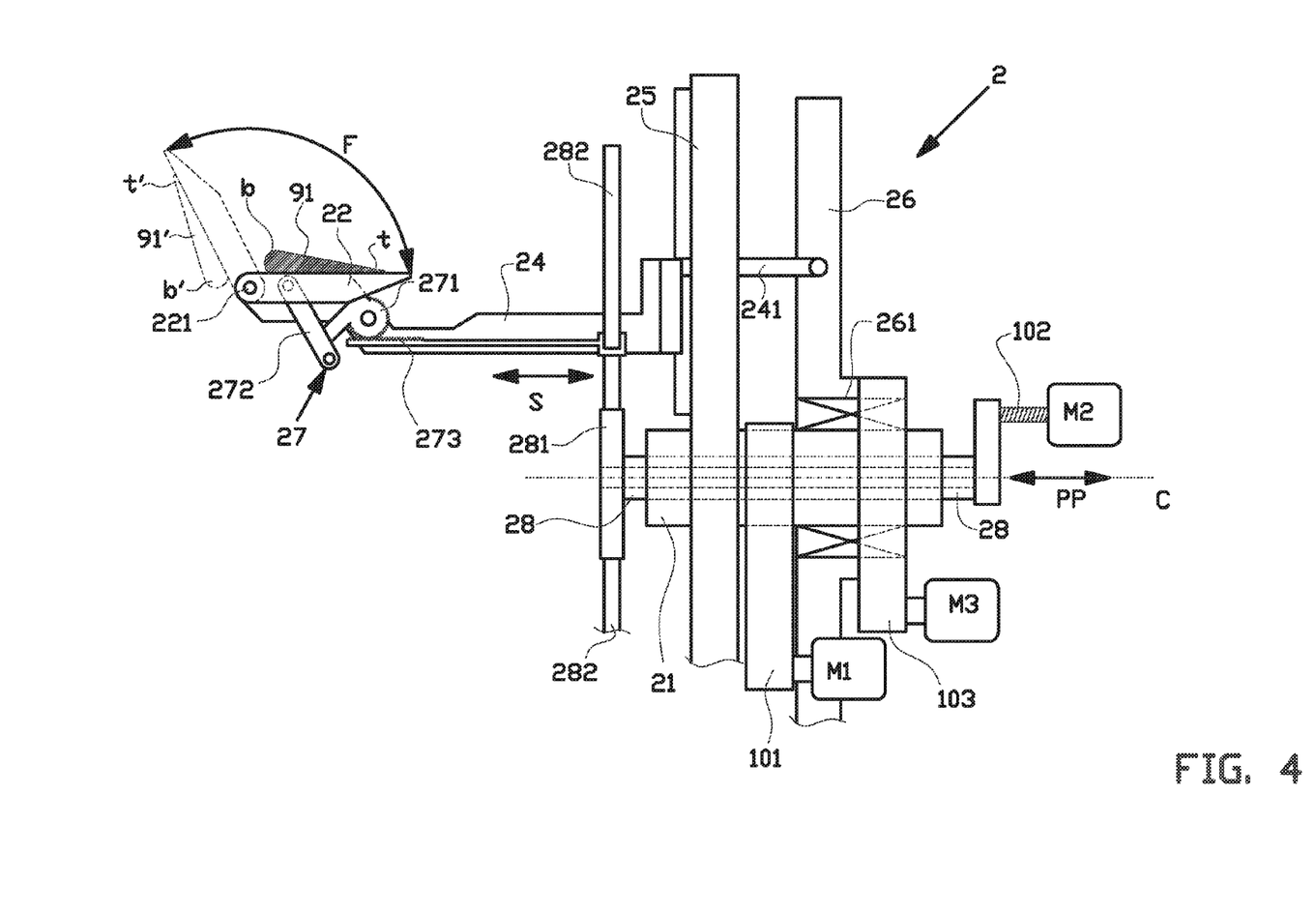
FIG. 4 shows a schematic cross section along the line I-I in FIG. 2.
Figure 5:
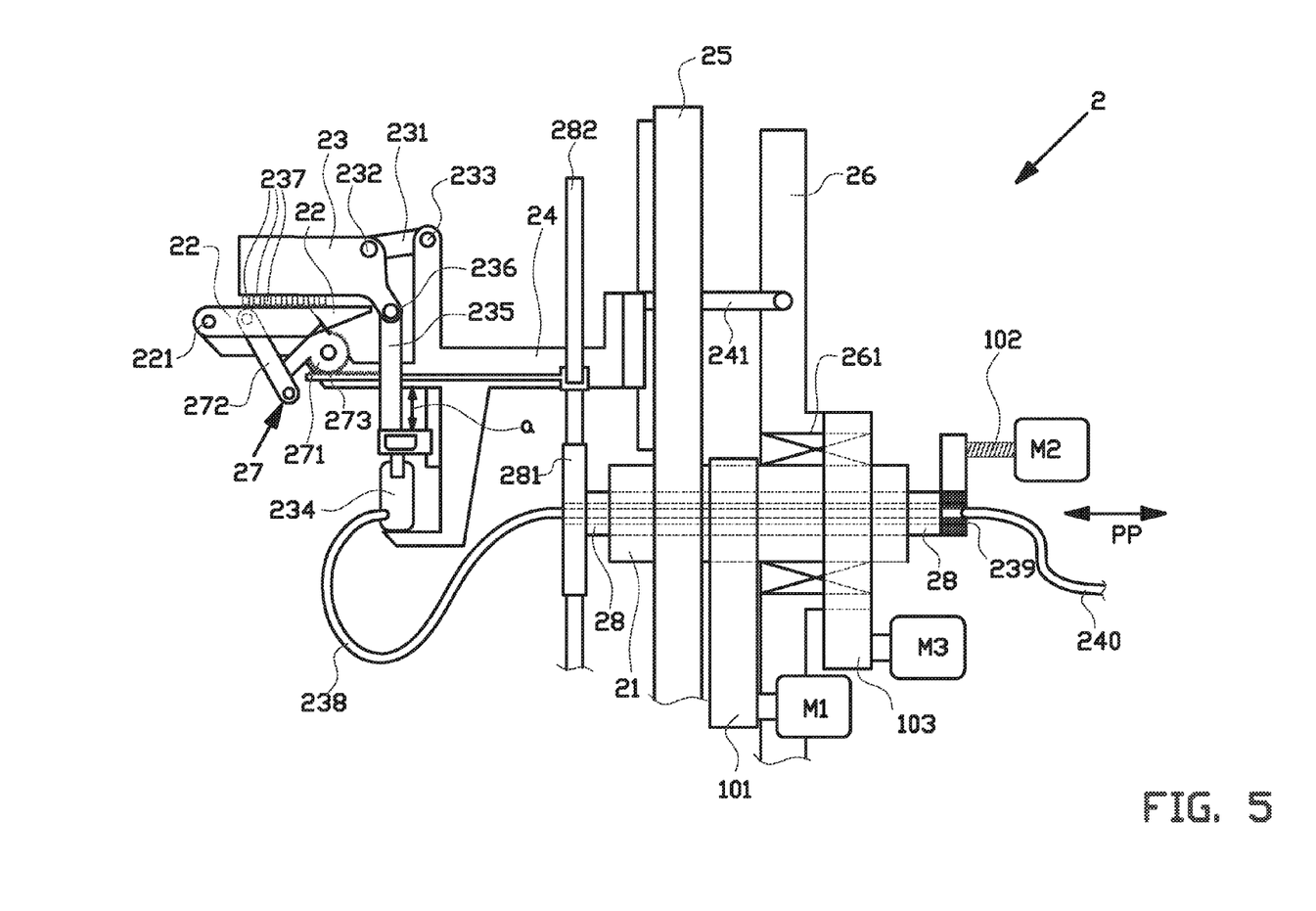
FIGS. 5 and 6 show a schematic cross section along the line II-II in FIG. 2 with the first gripper in a gripping and in a non-gripping position respectively.
Figure 6:
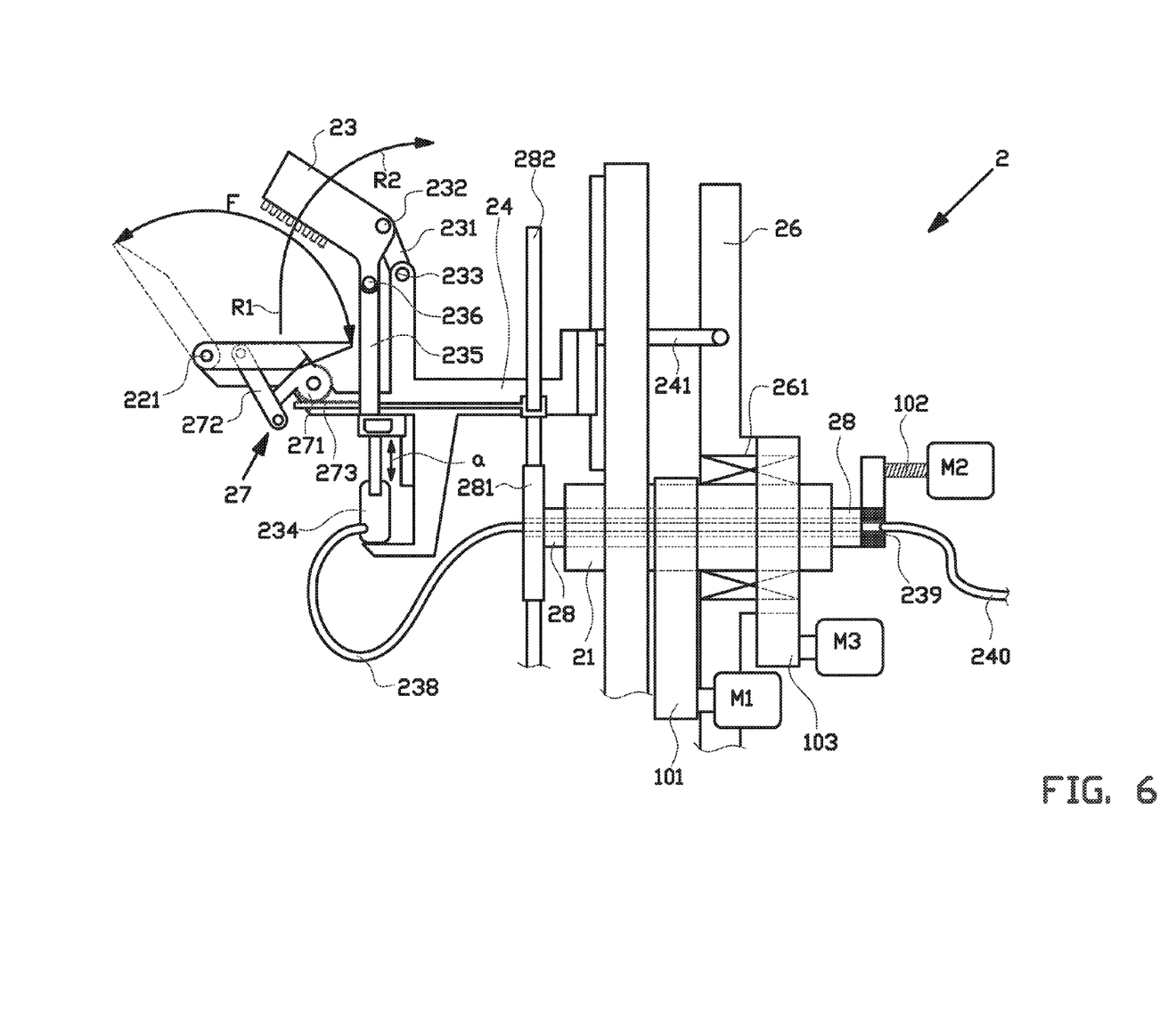

The fingers 22 are movably connected to support members 24 by means of a hinge connection 221 as shown in FIGS. 4, 5 and 6. Each support member 24 is movably connected to a substantially radially extending guiding member 25. The guiding members 25 are connected to the rotary shaft 21. Thus the diameter of the virtual circumferential path as defined by the circumferentially spaced apart fingers 22 can be set to substantially correspond to the required diameter for a particular tyre size. In FIG. 2, the fingers 22 are set for manufacturing apex fillers for tires with a small wheel rim, whereas in FIG. 3, the fingers 22 are set for manufacturing apex fillers for tires having a large wheel rim.

The cylindrical former 2 comprises a setting unit for setting radial position of the fingers 22. The setting unit comprises a setting plate 26 which is rotatably arranged on said rotary shaft 21, by means of a bearing 261 as schematically shown in FIG. 4. The setting plate 26 comprises at least one spiral slot as shown in the prior art document WO 2005/118271. In the embodiment shown in the enclosed figures, the setting plate 26 comprises a set spiral slots 262; one spiral slot 262 for each support member 24. Each of the support members 24 comprises at least one cam follower projection 241 which are received in the at least one spiral slot 262. When the setting plate 26 is rotated with respect to the guiding members 25, the spiral slots 262 will push the cam follower projections 241 and thus the support members 24 to move in a radial inwardly or outwardly direction.

The length of the apex filler strip 91 substantially corresponds to the circumferential length of the bead, to which the apex filler has to be attached. If one of the alternative diameters as shown in FIGS. 2 and 3 for the apex filler is used, the cutting device 12, the anvil 17 and the start positions X1, X2 of the grippers 31, 32 have to be adjusted to compensate for the shorter circumferential length of the apex filler strip. In addition, the relative heights of the feed assembly and the cylindrical former 2 are set or adjusted in such a way that the plane of conveyance is positioned with respect to the circumference of the plurality of fingers 22 for tangentially feeding the apex filler strip 91 in the direction of conveyance P towards the circumference of the plurality of fingers 22. When changing the diameter of the circumference of the plurality of fingers 22, for example from small in FIG. 2 to large in FIG. 3, the feed assembly is moved at least in a substantially vertical direction h with respect to the cylindrical former, in order to maintain the tangential feeding of the apex filler strip 91.

For arranging the apex filler strip 91 onto the cylindrical former 2, the leading end 93 of the apex filler strip 91 is held by the applicator clamp 80 and is moved towards to the first gripper 23 of the cylindrical former 2. Subsequently the first gripper 23 clamps the leading end of the apex filler strip 91 and the applicator clamp releases the apex filler strip 91. The cylindrical former 2 is rotated through one revolution so as to wind the apex filler strip 91 thereon. During this winding, the other one of the grippers 32 of the feed assembly carries the trailing end 94 of the apex filler strip 91 towards the cylindrical former 2, and positions the trailing end 94 near the leading end 93 as shown schematically in FIGS. 2 and 3. The ends 93, 94 of the length of apex filler 91, both of which have been cut at approximately 45 degrees, now abut each other with the trailing end 94 overlying the leading end 93. A splicing device 19 presses down in said trailing end 94 and the two still tacky ends 93, 94 are adhered together to form a annular apex filler 92.

Subsequently this annular apex filler 92 must be flipped over by the fingers 22 onto a position in which the annular base portion of the apex filler 92 surround a bead ring and the tapered portion extends like a collar radially outwardly of the annular base portion. For actuating the flipping movement, the fingers 22 are connected via linkages 27 to a push/pull shaft 28 which is arranged in and extends at least partially through the hollow rotary shaft 21.

As shown in FIG. 4, the linkages 27 comprises a gear wheel 271 which is connected to at least one of said fingers 22 via a single lever 272. Said linkages 27 further comprise a gear rack 273 which meshes with gear wheel 271 and wherein the gear rack 273 is connected to a driving member 281, wherein the driving member 281 is back and forth movable in the direction pp by said push/pull shaft as shown in FIG. 4. The gear rack 273 is slidably supported on one of said support members 24 in order to be slidable in the direction s which is substantially parallel to the moving direction pp of the push/pull shaft.

The driving member 281 comprises a substantial radially extending guiding elements 282 which are connected to the push/pull shaft 28, and the linkages 27, in particular the gear rack 273 thereof, are connected to and movable along the guiding elements 282.

As shown in FIG. 4, the cylindrical former 2 comprises:

a first drive M1 for rotating the rotary shaft 21, in particular using a toothed belt 101, a second drive M2 for moving the push/pull shaft 28 back and forth substantially along the centre axis c of the rotary shaft 21, in particular using a spindle drive 102, and a third drive M3 for rotating the setting plate 26, in particular using a toothed belt 103, for actuating the setting unit for moving the support members 24 radially inwardly or outwardly.

As shown in FIG. 4, the push/pull shaft 28 is coupled to the second drive M2 on one side of the rotary shaft 21 and/or the setting plate 26, extends through the hollow rotary shaft 21 and is coupled to the driving member 281 on the opposite side of the rotary shaft 21 and/or the setting plate 26.

When driving the rotary shaft 21 using the first drive M1 and the setting plate 26 using the third drive M3 synchronously, in particular at substantially the same rotation speed, the cylindrical former 2 is rotated around the centre axis c with the support members 24 at a constant radial position with respect to the centre axis c. Rotating the setting plate 26 at a different rotation speed than the rotary shaft 21, will cause the support members 24 to move radially inwardly or outwardly, depending on the relative direction of rotation of the setting plate 26 with respect to the rotary shaft 21.

As shown in FIGS. 5 and 6, the cylindrical former 2 comprises a first gripping device comprising a first gripper 23 for gripping the leading end 93 of an apex filler strip 91. The first gripping device is arranged on one of said support members 24. The first gripper 23 is hingedly connected to the support member 24 via a shank 231; the first gripper 23 is hingedly connected to a first end 232 of the shank 231, and an opposite second end 233 of the shank 231 is hingedly connected to said support member 24.

The first gripping device comprises an actuator 234, in particular a linear actuator, which is arranged for moving a drive rod 235 in a direction a, which drive rod 235 is hingedly connected 236 to said first gripper 23, for moving the first gripper 23 between a gripping position as shown in FIG. 5 and a non-gripping position as shown in FIG. 6.

As shown in FIGS. 5 and 6, the connection of the first end 232 of the shank 231 is at a distance to the connection 236 of the linear actuator 234. This three-hinge connection is arranged so that the first gripper 23 approaches the apex filler 91, when arranged on the finger of said cylindrical former, in a substantially radial oriented movement with respect to centre axis c of the cylindrical former 2. When opening the first gripper 23, said first gripper 23 will at first move in a substantially radial direction R1 and will subsequently swing R2 away out of the path of the movable finger 22, as shown in FIG. 6.

The finger 22 the support members 24 which comprises the first gripping device, provides a platform for supporting the apex filler 91. The first gripper 23 comprises a pressing element, wherein the pressing element comprises an array of pressure pins 237 which face towards the platform. The pressure pins 237 are arranged for contacting the platform and an apex filler 91 supported thereon. The pressure pins 237 are biased to move towards the platform, wherein, when the first gripper 23 is moved in the gripping position to engage the apex filler 91, at least some of the pressure pins 237 are arranged for contacting the apex filler 91 and are arranged to be pushed back against their bias as a result of said contact. Thus the leading end 93 of the apex filler 91 can be securely retained by the first gripper 23.

The linear actuator 234 comprises a pneumatic cylinder which is driven using a pressurized gas, such as compressed air, and/or applying a vacuum. Said actuator 234 is connected to one or more supply hoses 238, which supply the pressurized gas and/or the vacuum to the pneumatic cylinder for driving the first gripper 23 back and forth between the gripping position as shown in FIG. 5 and the non-gripping position as shown in FIG. 6, substantially along the trajectory R1 and R2. In the exemplary embodiment as shown in the figures, the push/pull shaft 28 is a hollow push/pull shaft, and the supply hoses 238 extend at least partially through the hollow push/pull shaft 28.

Alternatively, the linear actuator 234 can be an electric motor or a hydraulic cylinder, and the supply cables or supply hoses for these actuators also extend at least partially through the hollow push/pull shaft 28, in the same way as shown in the figures.

Preferably, the push/pull shaft 28 is rotation fixedly arranged in the hollow rotary shaft 21. Thus the push/pull shaft 28 will rotate together with the hollow rotary shaft 21. The push/pull shaft 28 is provided with a rotatable coupling 239, in particular a rotatable electrical coupling or a rotatable fluid coupling. Due to this rotatable coupling 239, the supply cables or supply hoses 238 can rotate together with a rotation of the rotary shaft 21, whereas the supply cables or supply hoses 240 between the rotatable coupling 239 and an external supply for operating the actuator 234 do not rotate with the rotary shaft 21.

Said apparatus 1 can be used for forming an annular apex filler 91 using a method comprising the steps of:

providing a length of an apex filler R1 of elastomeric material, the apex filler 91 having an annular base portion b and an annular tapering portion t for extending axially away from the base portion b;

gripping a leading end 93 of said length of apex filler 91 using said first gripper 23 so as to retain said end 93 on the cylindrical former 2;

gripping a trailing end 94 of said length of apex filler 91 using gripping means 32;

rotating said cylindrical former 2 so that said length of apex filler 91 is wound thereon in a single turn and is supported by the fingers 22, whilst moving said gripping means 32 and said gripped trailing end 94 towards said cylindrical former 2;

joining said leading 93 and trailing 94 ends together; and flipping F the apex filler 91' so that the tapering portion t' radially surrounds the base portion b' and the tapering portion t' extends generally radially outwardly.

In addition, said apparatus 1 can be used for forming an annular apex filler 91 using a method comprising the steps of:

providing a cut length of an apex filler 91 of elastomeric material in an annular configuration on the cylindrical former 2, the apex filler having an annular base portion b and an annular tapering portion t for extending axially away from the base portion b, so that the cut ends 93, 94 are aligned and abut one another, and flipping F the apex filler 91' using the plurality of circumferentially spaced apart fingers 22, so that the tapering portion t' radially surrounds the base portion b' and the tapering portion t' extends generally radially outwardly, wherein the fingers 22 being actuated to flip the apex filler 91 by means of the driving member 281 which is connected to the push/pull shaft 28 which extends at least partially through the hollow rotary shaft 21, wherein the fingers 22 are connected to the driving member 281 via linkages 27.

In summary, the present invention relates to an apparatus for forming an annular apex filler. Said apparatus comprises a cylindrical former for supporting a cut length of an apex filler of elastomeric material, wherein said cylindrical former comprises a hollow rotary shaft and a plurality of rigid, circumferentially spaced apart fingers. The fingers are movably connected to support members for flipping the apex filler when wound on the cylindrical former. The support members are movable connected to substantially radially extending guiding members. The guiding members are connected to a hollow rotary shaft. The fingers are connected via linkages to a driving member which is connected to a push/pull shaft which extends at least partially through the hollow rotary shaft. Said apparatus further comprises a setting unit which is arranged for moving the support members radially inwardly or outwardly, and a feed assembly for feeding said apex filler to said cylindrical former.

It is to be understood that the above description is included to illustrate the operation of the preferred embodiments and is not meant to limit the scope of the invention. From the above discussion, many variations will be apparent to one skilled in the art that would yet be encompassed by the spirit and scope of the present invention.

The invention claimed is:

1. An apparatus for forming an annular apex filler, comprising:
   a cylindrical former configured to support a cut length of an apex filler of elastomeric material, wherein said cylindrical former comprises a rotary shaft and a plurality of rigid, circumferentially spaced apart fingers, said fingers are movably connected to support members and are configured to flip the apex filler when wound on the cylindrical former, wherein said support members are movably connected to substantially radially extending guiding members, wherein the guiding members are connected to the rotary shaft,
   a setting unit which is arranged for moving the support members radially inwardly or outwardly, and
   a feed assembly for feeding said apex filler to said cylindrical former,
   wherein the rotary shaft is a hollow rotary shaft, and the fingers are connected via linkages to a driving member which is connected to a push/pull shaft which extends at least partially through the hollow rotary shaft.

2. The apparatus according to claim 1, wherein at least one of said linkages comprises a gear wheel which is connected to at least one of said fingers, and a gear rack which is actively connected to said gear wheel and wherein the gear rack is connected to said driving member, wherein the driving member is back and forth movable by said push/pull shaft.

3. The apparatus according to claim 2, wherein the gear rack is slidably supported on one of said support members.

4. The apparatus according to claim 1, wherein each support member comprises at least one of said fingers and at least one of said linkages.

5. The apparatus according to claim 4, wherein the driving member comprises a substantial radially extending guiding elements which are connected to the push/pull shaft, and wherein the linkages are connected to and movable along the guiding elements.

6. The apparatus according to claim 1, wherein the cylindrical former comprises a first gripping device comprising a first gripper for gripping the apex filler, wherein the first gripping device comprises an actuator for moving the first gripper between a gripping and a non-gripping position.

7. The apparatus according to claim 6, wherein the push/pull shaft is a hollow push/pull shaft, and wherein the actuator is connected to a supply cable or supply hose, which supply cable or supply hose extends at least partially through the hollow push/pull shaft.

8. The apparatus according to claim 7, wherein the push/pull shaft is rotation fixedly arranged in the hollow rotary shaft, and wherein the push/pull shaft is provided with a rotatable electrical coupling or a rotatable fluid- and/or vacuum coupling.

9. The apparatus according to claim 6, wherein the first gripping device is connected to one of said support members, wherein the connection is arranged for approaching the apex filler in a substantially radial oriented movement with respect a centre axis of the cylindrical former.

10. The apparatus according to claim 6, wherein the first gripping device is arranged on one of said support members.

11. The apparatus according to claim 10, wherein the first gripper is hingedly connected to said one of said support members.

12. The apparatus according to claim 11, wherein the actuator is a substantially linear actuator which is hingedly connected to said first gripper, wherein said first gripper is hingedly connected to a first end of a shank, and wherein an opposite second end of the shank is hingedly connected to said support member.

13. The apparatus according to claim 10, wherein at least one finger of said one of said support members provides a platform for supporting the apex filler, and wherein the first gripper comprises a pressing element, wherein the pressing element comprises an array of pressure pins which face towards the platform, wherein the pressure pins are arranged for contacting the platform and the apex filler supported thereon.

14. The apparatus according to claim 13, wherein the pressure pins are biased to move towards the platform, wherein, when the first gripper is moved in the gripping position to engage the apex filler, at least some of the pressure pins are arranged for contacting the apex filler and are arranged to be pushed back against their bias as a result of said contact.

15. The apparatus according to claim 1, wherein the fingers are hingedly connected to said support members.

16. The apparatus according to claim 1, wherein the setting unit comprises a setting plate which is rotatably arranged on said rotary shaft.

17. The apparatus according to claim 16, wherein the setting plate comprises at least one spiral slot, and wherein each of the support members comprises at least one cam follower projection which are received in the at least one spiral slot.

18. The apparatus according to claim 17, wherein the setting plate comprises one spiral slot for each one of said support members.

19. The apparatus according to claim 16, wherein the push/pull shaft extends from one side of the setting plate, through the hollow rotary shaft, to the opposite side of the setting plate.

20. The apparatus according to claim 1, further comprising a first drive for rotating the rotary shaft and a second drive for moving the push/pull shaft back and forth substantially along the centre axis of the rotary shaft.

21. The apparatus according to claim 19, further comprising a first drive for rotating the rotary shaft and a second drive configured to move the push/pull shaft back and forth substantially along the centre axis of the rotary shaft, wherein the push/pull shaft is coupled to the second drive on the one side of the setting plate and to the driving member on the opposite side of the setting plate.

22. The apparatus according to claim 20, further comprising a third drive for actuating the setting unit for moving the support members radially inwardly or outwardly.

23. The apparatus according to claim 1, wherein the a feed assembly comprises a conveyor configured to support the apex filler along a substantially linear path towards said cylindrical former.

24. The apparatus according to claim 23, wherein the feed assembly and the cylindrical former are movable with respect to each other.

25. The apparatus according to claim 24, wherein the feed assembly is substantially vertical movable with respect to the cylindrical former.

26. A method of forming an annular apex filler using an apparatus according to claim 1, said method comprising the steps of:

providing a cut length of an apex filler of elastomeric material in an annular configuration on the cylindrical former, the apex filler having an annular base portion and an annular tapering portion for extending axially away from the base portion, so that the cut ends are aligned and abut one another, and flipping the apex filler using the plurality of circumferentially spaced apart fingers, so that the tapering portion radially surrounds the base portion and the tapering portion extends generally radially outwardly, wherein the fingers are being actuated to flip the apex filler by means of the driving member which is connected to the push/pull shaft which extends at least partially through the hollow rotary shaft, wherein the push/pull shaft is driven back and forth substantially along the centre axis of the rotary shaft, and wherein the fingers are connected to the driving member via linkages.

27. The method according to claim 26, wherein the push/pull shaft extends at least partially through the hollow rotary shaft from the side of the rotary shaft at the driving member, wherein, on the opposite side of the rotary shaft with respect to the driving member, the push/pull shaft is connected to a driving means that drives the push/pull shaft back and forth substantially along the centre axis of the rotary shaft.

28. The apparatus according to claim 21, further comprising a third drive for actuating the setting unit for moving the support members radially inwardly or outwardly.

* * * * *